March 29, 1955 E. O. HOLLAND ET AL 2,705,285

WAVEFORM GENERATOR, PARTICULARLY FOR TELEVISION

Filed Aug. 30, 1949 2 Sheets-Sheet 1

Inventors
Ernest Oliver Holland
James Boyd Smith
By Blair + Black
Attorneys

WAVEFORM GENERATOR, PARTICULARLY FOR TELEVISION

Filed Aug. 30, 1949 2 Sheets-Sheet 2

Inventors
ERNEST Oliver Holland
James Boyd Smith
By O'Boyle + Blair
Attorneys

United States Patent Office

2,705,285
Patented Mar. 29, 1955

2,705,285

WAVEFORM GENERATOR, PARTICULARLY FOR TELEVISION

Ernest Oliver Holland and James Boyd Smith, Cambridge, England, assignors to Pye Limited, Cambridge, England, a British company Application August 30, 1949, Serial No. 113,126

Claims priority, application Great Britain August 31, 1948

13 Claims. (Cl. 250—36)

Figure 1:
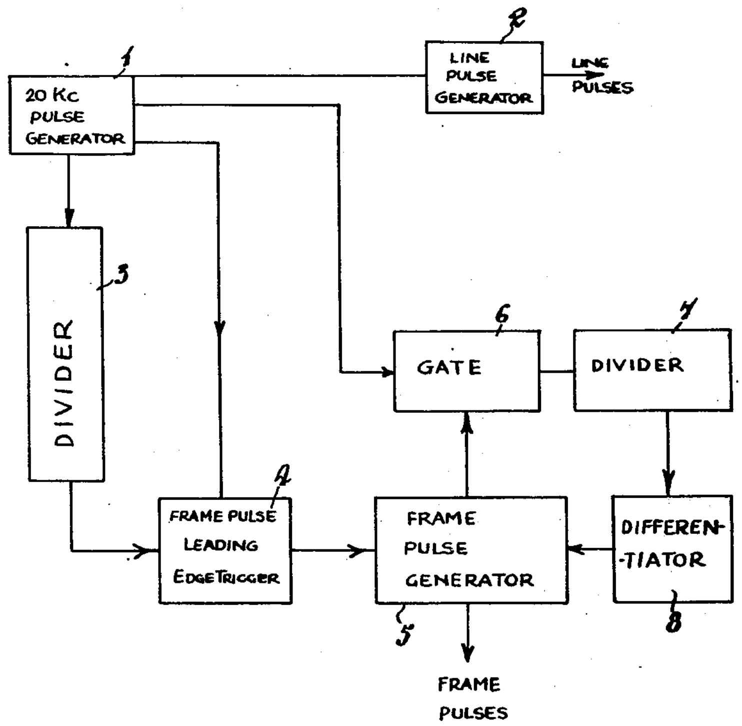

The present invention relates to a waveform generator, and particularly to an arrangement for generating the waveform, comprising the line and frame synchronising pulses, of a television transmitter.

According to the present invention, the master pulses used for generating or triggering the line pulses are fed through a divider comprising a plurality of series-connected binary electronic counting devices which are so connected as to produce the requisite division and produce an output pulse after the desired number of line pulses, the output pulse from the divider being used to trigger the frame pulse generator.

From another aspect, the invention consists in a waveform generator, particularly for television, wherein the train of master pulses used for controlling the generation of the line pulses are also fed through a divider in the form of an electronic counter, which may for example comprise a plurality of series-connected binary counting units having feed back connections between the units, to produce an output pulse from the counter at the end of a number of master pulses corresponding or proportional to the number of lines in the television picture to be transmitted, and in controlling the triggering of the frame pulse generator by means of the output pulse from the electronic counter.

A feature of the invention consists in using the output pulse from the divider to establish a condition whereby the frame pulse generator will be triggered by the next following pulse of the master pulse train, whereby accurate timed relation between the line and frame pulses is obtained and the effect of any time delays occurring in the divider may be avoided. The circuit for this purpose is herein referred to as the frame pulse leading edge trigger. The frame pulse leading edge trigger may also be used for controlling the triggering of any other pulses connected with the framing, for example the frame blanking pulses.

A further feature of the invention consists in the provision, in a television waveform generator, of a frame pulse leading edge trigger which is triggered by a signal which is a sub-multiple of the line pulses and establishes a condition such that the application thereto of the next following pulse corresponding to a line pulse will trigger the frame pulse generator to initiate the production of a frame pulse.

According to another feature of the invention, the starting of the frame pulse generator opens a gate valve or the like which allows a train of pulses corresponding to the line synchronising pulses to be fed therethrough to a divider in the form of an electronic counter which produces, in the output thereof, a pulse after the predetermined number of input pulses have been fed thereto, said output pulse being used to cut-off the frame pulse generator. This electronic counter also preferably comprises a plurality of series-connected binary counters.

The binary counters used in either of the dividers above referred to may comprise resistance-coupled multivibrators and are preferably constructed as described in the specification of copending application Serial No. 113,125 of Ernest Oliver Holland, filed August 30, 1949, Patent No. 2,644,886, dated July 7, 1953.

The frame pulse leading edge trigger may comprise a similar resistance-coupled multivibrator but arranged for asymmetric operation. Likewise, the frame pulse generator preferably comprises an asymmetric resistance-coupled multivibrator which is triggered on and off by the application of the starting pulse to one and the stopping pulse to the other of the two valves of the multivibrator.

Figure 2:
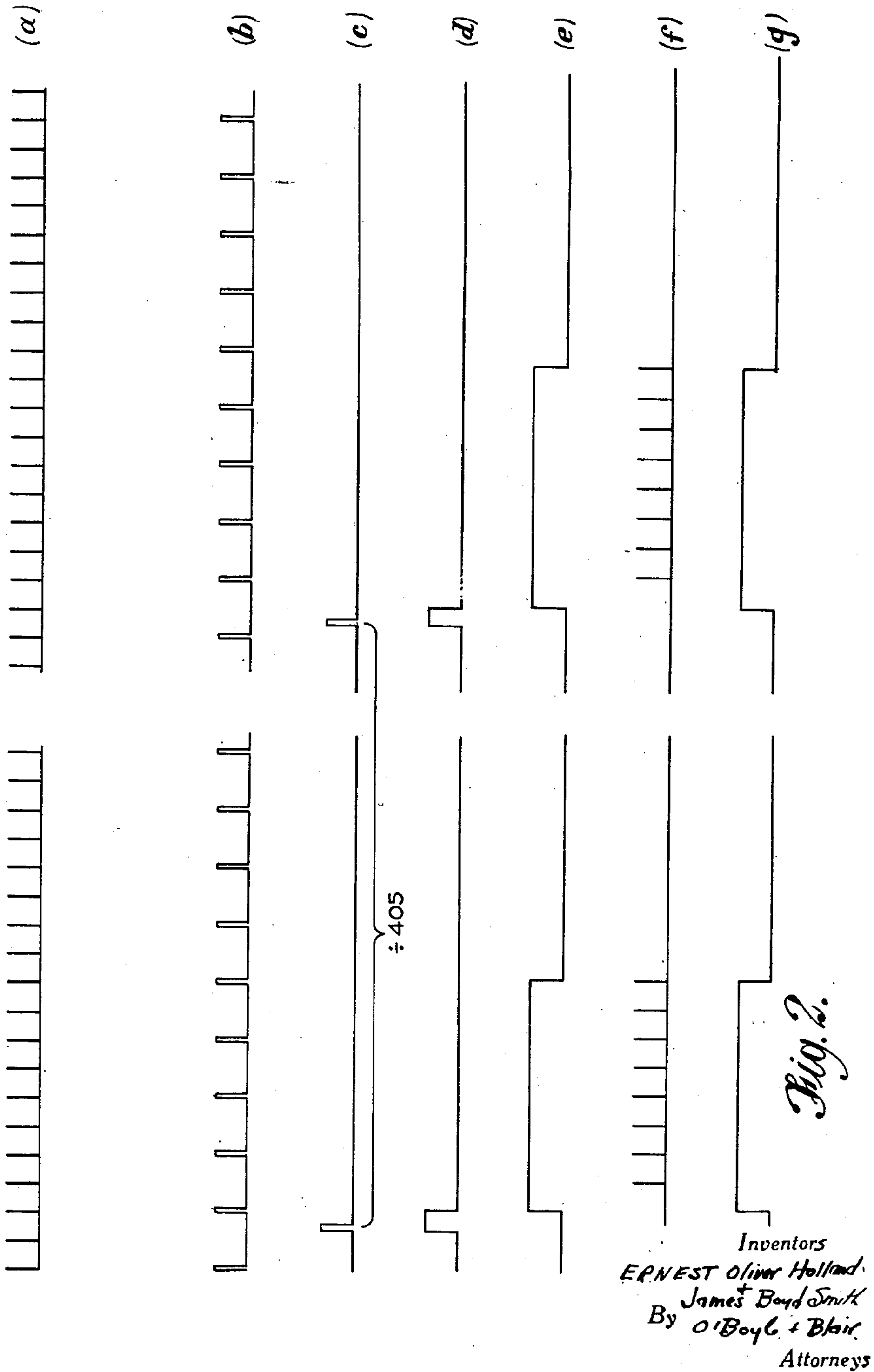

In order that the invention may be more clearly understood, reference will now be made to the accompanying drawing in which Fig. 1 shows a block circuit diagram of one embodiment of a waveform generator according to this invention, and Fig. 2 shows waveforms explaining the circuit in Fig. 1.

Referring to the drawing, the master pulse generator 1 produces a series of master pulses as shown in waveform *e* having a repetition frequency suitable for producing line synchronising pulses. For example, for the British television waveform, the master pulse generator 1 may produce 20.25 kc. pulses, which are applied to the line pulse generator 2. The output from the line pulse generator 2 is shown in waveform *b*. The master pulses are also fed to a divider 3 comprising a plurality of series-connected binary counters constructed as described in the aforesaid copending application Serial No. 113,125 of Ernest Oliver Holland, filed August 30, 1940, Patent No. 2,644,886, dated July 7, 1953 so as to produce a pulse in the output thereof after the predetermined number of line pulses have been generated. This output pulse from the divider 3 is shown in waveform *c*. In applying the invention to the production of a television waveform corresponding to the present British standards of 405 lines, the divider must effect a division of the master pulses by 405, that is, one output pulse must be produced for every 405 master pulses. This is effected by constructing the divider with 9 series-connected binary counters, which would produce a division of 512, and feeding back pulses from a later stage to a preceding stage for advancing the count. Thus, to obtain the required division by 405 with the 9 series-connected binary counters, it is necessary to feed back 107 pulses to advance the count by 107. This is effected by feeding back pulses from the output of the ninth binary unit to the first, second, fourth, sixth and seventh binary units.

The output pulses from the divider 3 are fed to the frame pulse leading edge trigger 4 which comprises a resistance-coupled multivibrator circuit as described in the aforesaid copending application but arranged for asymmetric operation. The output pulses from the divider 3 are fed as negative pulse to the anode of one of the two valves of the circuit, master pulses from the master pulse generator 1 being fed as negative pulses to the anode of the other valve. Thus, the frame pulse leading edge trigger is normally held with one of its valves conducting by reason of the application thereto of the series of master pulses from the generator 1. Upon a pulse being fed to the anode of the other valve from the output of the divider 3 however, the multivibrator changes over to render the second valve conducting, being shortly thereafter triggered back to its normal position by the application of the next succeeding pulse of the master pulse train. This change-over produces a short pulse in the output circuit of the second valve, which is shown in waveform *d* and which is fed to the frame pulse generator 5 which is triggered by the trailing edge of this output pulse, as shown in waveform *e*. Thus, the frame pulse generator 5 is always triggered in correct timed relation with the line synchronising pulses by that pulse from the master pulse generator 1 which immediately follows an output pulse from the divider 3. Due to the fact that the frame pulse leading edge trigger 4 has been restored by the master pulses to its normal condition, no further pulse is fed to the frame pulse generator 5 until after the divider has counted a further 405 master pulses.

Master pulses from the master pulse generator 1 are also fed to a gate valve 6 having its grid normally biassed-off so that it is non-conducting. The starting of the frame pulse generator 5, however, opens the gate valve 6, as shown in waveform (*g*), to allow the master pulses to pass therethrough, as shown in waveform (*f*), to a second divider 7 comprising a plurality of series-connected binary counters to effect a division and count the number of pulses corresponding to the time duration of a frame pulse. In the British system, this corresponds to 8 of the master pulses and, therefore, the divider 7 effects a division by 8. The eighth pulse produces an output pulse from the divider 7 which after differwater so as to render the technical application of water possible. Therefore, it is of no consequence which hydroxides or salts are employed provided that they are sufficiently water-soluble and neutral, i. e. they must not form stable addition products with the nitrogen compounds to be separated and that they do not undergo reaction with the nitrogen compounds. Especially suitable salts are, for instance, common salt, sodium sulphate, sodium carbonate, sodium phosphate, sodium acetate, sodium formate as well as the corresponding potassium salts and alkali hydroxides, such as sodium and potassium hydroxide. Further substances which may be employed, are described, for instance, in British specification No. 475,818. The said salt solution may contain according to the special requirements only small amounts of the salt or quantities up to saturation. On using alkali hydroxides, solutions containing from about 5% to about 40% of the hydroxide are preferred.

Which of the nitrogen compounds is preferably absorbed depends on the nature of the absorbent applied. Thus, the invention permits of adapting the process to the prevailing conditions of the various absorbents in the single steps of the reaction. On the other hand, it is possible to apply the absorbents in combination in the same step as far as they agree as to their separating activity. For instance, the weak acids may be employed in combination with neutral solvents boiling not substantially lower than the weak acid applied and being indifferent to the weak acid as well as to the nitrogen compounds and yielding homogeneous mixtures with the weak acid. Suitable solvents are for instance o-dichlorobenzene, 1.2.4-trichlorobenzene, nitrobenzene, tetralin, dekalin, higher boiling aliphatic or aromatic hydrocarbons as far as they are still liquid under the reaction conditions applied, as well as higher boiling ethers, alcohols, ketones and polyalcohols.

The application of mixtures of the weak acids with the organic solvents is especially advantageous in the separation of ammonia from mixtures containing methyl amines and in the separation of a mixture consisting of mono- and dimethylamine. Furthermore, it is possible in the separation of trimethylamine from methylamine mixtures being free of ammonia to increase the separating activity of the weak acids by addition of water. Of course, water must not be added in quantities exceeding saturation at the temperatures employed.

The process according to the invention may be advantageously carried out by a continuous method by feeding the reaction mixture, if desired under pressure, in a reaction tower counter-currently to the flow of the absorbent. By appropriately adjusting the flow velocity and the temperature one or more nitrogen compounds are selectively dissolved in the weak acids or in the said other absorbents applied whereas the nitrogen compounds not absorbed escape as vapours at the top of the reaction tower. The absorbed compounds are expelled from the absorbent as described above. By repeating the process once or several times each of the components contained in the starting mixture may be obtained in pure form.

The process herein described is substantially different from that disclosed in German Patent 615,527. German Patent 615,527 comprises the separation of trimethylamine and ammonia by treatment with acids in quantities insufficient for neutralization. The resultant salts cannot be decomposed again by merely heating or by reducing the pressure.

The invention is further illustrated by the following examples, without being restricted thereto.

*Example 1*

A mixture of 62.5% by volume of ammonia and 37.5% by volume of trimethylamine is passed through a liquid mixture of 25% by weight of phenol and 75% by weight of o-dichlorobenzene. At the beginning the mixture is completely absorbed. After saturation of the absorbent a mixture of 90% by volume of ammonia and 10% by volume of trimethylamine escapes. The mixture of ammonia and trimethylamine dissolved in the absorbent is expelled again by heating to 170° C. The mixture consists of 33% by volume of ammonia and 67% by volume of trimethylamine. By repeating the process several times, each of the two components is obtained in pure form.

*Example 2*

A mixture of ammonia and dimethylamine is introduced into a molten mixture of α- and β-naphthol, the proportion of the mixtures being 1:1. After saturation of the naphthol melt at about 90° C. with the bases a gas mixture consisting of 68% by volume of ammonia and 32% by volume of dimethylamine escapes. By repeating the process several times, each of the two components is obtained in pure form.

*Example 3*

400 parts by weight of a solvent mixture consisting of 25% by weight of phenol and 75% by weight of o-dichlorobenzene is saturated with a mixture consisting of 78% by volume of trimethylamine and 22% by volume of ammonia. 108 parts by weight of the mixture are totally absorbed. Thereupon pure trimethylamine is introduced into the saturated solution through a glass frit. The escaping gas mixture consists of 50% by volume each of ammonia and trimethylamine. As soon as the content of ammonia in the escaping gas decreases feeding of pure trimethylamine is stopped. By heating the solution 112 parts by weight of a 96.5% trimethylamine are obtained.

*Example 4*

M-cresol and a gas mixture of approximately equal parts by volume of ammonia, dimethylamine, and trimethylamine are contacted in countercurrent in an absorption tower packed with Raschig rings, said absorption tower having a length of 2.50 m. and a diameter of 3 cm. 45 liters of the aforesaid mixture and 120 grams of m-cresol are charged each hour. The gas escaping at the top of the tower consists of 99% ammonia whereas the mixture of methylamines expelled from the absorbent is almost free from ammonia.

*Example 5*

The mixture of dimethylamine and trimethylamine set free on heating the sump obtained according to Example 4 is contacted with m-cresol in an absorption tower as indicated in Example 4. About 48 liters of the mixture of the methylamines and 90 grams of m-cresol are charged each hour. 98% trimethylamine escapes at the top of the reaction tower whereas a 90% dimethylamine is obtained by heating the sump solution.

*Example 6*

A mixture consisting of 55% by volume of ammonia, 15% by volume each of mono-, di-, and trimethylamine is contacted in countercurrent with a technical cresol mixture (30 grams per hour) in an absorption tower packed with Raschig rings, said absorption tower having a diameter of 25 mm. and a height of 2.50 m.; the throughput of said mixture amounts to 30 liters per hour. The non-absorbed gas contains 100% of the amount of ammonia charged and 95% of the trimethylamine charged and is free from mono- and dimethylamine.

The mixture absorbed by the cresol and containing besides small amounts of trimethylamine, the whole mono- and dimethylamine is contacted after expelling from the solvent with a mixture consisting of 1 part by weight of phenol and 3 parts by weight of o-dichlorobenzene in the same reaction tower and in similar manner.

100% monomethylamine escapes at the top of the reaction tower whereas 92% dimethylamine is obtained from the sump solution.

*Example 7*

A mixture of 49% by volume of ammonia and 17% by volume each of mono-, di-, and trimethylamine at a rate of 29 liters per hour is contacted, in countercurrent, at room temperature with a caustic soda solution of 10% strength in an absorption tower packed with Raschig rings and having a height of 2.50 m. and a diameter of 25 mm. The gas mixture is fed at a point in the middle of the tower, the sump of the absorption tower is heated to 45° C. When charging 70 $cm.^3$ of caustic soda solution per hour 100% trimethylamine is taken off from the top of the tower. The dissolved nitrogen compounds are practically free from trimethylamine.

The dissolved mixture of nitrogen compounds is expelled by heating and contacted in a similarly constructed tower with a technical cresol mixture of such an amount that the mono- and dimethylamine contained in the mixture are dissolved whereas pure ammonia escapes at the top of the tower.

the master pulses from the master pulse generator to said gating circuit, said gating circuit being normally closed and blocking the master pulses fed thereto, a connection for feeding frame pulses generated by said frame pulse generator to said gating circuit, means for opening said gating circuit upon a frame pulse from said frame pulse generator being fed thereto and thereby allow the master pulses fed to the gating circuit to pass therethrough, a second divider circuit and a connection for feeding the master pulses passed by said gating circuit to said second divider circuit and a connection for feeding the output pulses from the second divider circuit to cut-off the frame pulse generator.

9. In apparatus for generating a television waveform comprising line and frame synchronising pulses, a master pulse generator, a line pulse generator, a frame pulse generator, a connection for feeding the master pulses from the master pulse generator to trigger the line pulse generator a first divider circuit to produce an output pulse after each predetermined number of master pulses, a connection for feeding the master pulses from the master pulse generator to said first divider circuit, a trigger circuit having two stable operating conditions, a connection for feeding the master pulses from the master pulse generator to the trigger circuit to hold the trigger circuit in one of said stable operating conditions, a connection for feeding the output pulses from the first divider circuit to the trigger circuit, means responsive to said output pulses of the first divider circuit to change the trigger circuit to its second stable operating condition, means responsive to the restoration of the trigger circuit to its first stable operating condition by the master pulses next succeeding an output pulse from the first divider circuit to trigger the frame pulses generator, a gating circuit, a connection for feeding the master pulses from the master pulse generator to said gating circuit, said gating circuit being normally closed and blocking the master pulses fed thereto, a connection for feeding frame pulses generated by said frame pulse generator to said gating circuit, means for opening said gating circuit upon a frame pulse from said frame pulse generator being fed thereto and thereby allow the master pulses fed to the gating circuit to pass therethrough, a second divider circuit a connection for feeding the master pulses passed by said gating circuit to said second divider circuit and a connection for feeding the output pulses from the second divider circuit to cut-off the frame pulse generator.

10. In television transmitting apparatus, a master pulse generator, a frame pulse generator, a first divider circuit, means for feeding the master pulses from the master pulse generator to said first divider circuit, a trigger circuit having two stable operating conditions, means for feeding the master pulses from the master pulse generator to the trigger circuit to hold the trigger circuit in one of said stable operating conditions, means for feeding the output pulses from the first divider circuit to the trigger circuit, means responsive to said output pulses of the first divider circuit to change the trigger circuit to its second stable operating condition, means responsive to the restoration of the trigger circuit to its first stable operating condition by the master pulses next succeeding an output pulse from the first divider circuit to trigger the frame pulses generator, a gating circuit, means for feeding the master pulses from the master pulse generator to said gating circuit, said gating circuit being normally closed and blocking the master pulses fed thereto, means for feeding frame pulses generated by said frame pulse generator to said gating circuit, means for opening said gating circuit upon a frame pulse from said frame pulse generator being fed thereto and thereby allow the master pulses fed to the gating circuit to pass therethrough, a second divider circuit, means for feeding the master pulses passed by said gating circuit to said second divider circuit and means for feeding the output pulses from the second divider circuit to cut-off the frame pulse generator.

11. Apparatus as claimed in claim 10, wherein the first and second divider circuits each comprise a plurality of series-connected binary electronic counting units.

12. In apparatus for generating a television waveform comprising line and frame synchronising pulses, a master pulse generator, a line pulse generator, a connection for feeding the master pulses from the master pulse generator to trigger the line pulse generator a divider circuit comprising a plurality of series-connected binary electronic counting units which are connected to produce an output pulse after each predetermined number of master pulses, a connection for feeding the master pulses from the master pulse generator to the divider circuit and means for producing frame pulses from the output of said divider.

13. In apparatus for generating a television waveform comprising line and frame synchronising pulses, a master pulse generator, a line pulse generator, a connection for feeding the master pulses from the master pulse generator to trigger the line pulse generator, a divider circuit comprising a plurality of series-connected binary electronic counting units having at least one feedback connection between said units whereby to produce an output pulse from the divider circuit at the end of a number of master pulses proportional to the number of lines of the television picture to be transmitted, a connection for feeding the master pulses from the master pulse generator to the divider circuit and means for producing frame pulses from the output of said divider.

References Cited in the file of this patent

UNITED STATES PATENTS

| | | |
|---|---|---|
| 2,145,332 | Bedford | Jan. 31, 1939 |
| 2,166,688 | Kell | July 8, 1939 |
| 2,420,516 | Bischoff | May 13, 1947 |
| 2,482,932 | Pyatt et al. | Sept. 27, 1949 |